US007641034B2

(12) United States Patent
Boustani

(10) Patent No.: US 7,641,034 B2
(45) Date of Patent: Jan. 5, 2010

(54) DOCUMENT CONVEYING SYSTEM

(76) Inventor: Hadi C. Boustani, 7209 Blacklock Rd., Bethesda, MD (US) 20817

( * ) Notice: Subject to any disclaimer, the term of this patent is extended or adjusted under 35 U.S.C. 154(b) by 0 days.

(21) Appl. No.: 12/103,998

(22) Filed: Apr. 16, 2008

(65) Prior Publication Data

US 2009/0260946 A1    Oct. 22, 2009

(51) Int. Cl.
*B65G 11/06* (2006.01)
(52) U.S. Cl. .......................... 193/12; 198/778
(58) Field of Classification Search ............... 198/778; 193/12; 414/299
See application file for complete search history.

(56) References Cited

U.S. PATENT DOCUMENTS

| | | | | |
|---|---|---|---|---|
| 817,341 | A | * | 4/1906 | Schwab .................. 193/12 |
| 1,014,262 | A | * | 1/1912 | Schwab .................. 193/12 |
| 1,515,890 | A | * | 11/1924 | Sekulski ................. 193/12 |
| 1,802,089 | A | | 4/1931 | Pfeiffer |
| 3,565,226 | A | * | 2/1971 | Winchester ............. 193/12 |
| 3,976,176 | A | | 8/1976 | Kurtz et al. |
| 4,726,456 | A | | 2/1988 | Hogsett |
| 5,083,651 | A | | 1/1992 | Wiese |
| 5,598,914 | A | | 2/1997 | Sulzer et al. |
| 6,851,911 | B2 | | 2/2005 | Lhoest |

* cited by examiner

*Primary Examiner*—James R Bidwell
(74) *Attorney, Agent, or Firm*—Sand & Sebolt

(57) ABSTRACT

A chute system for conveying articles, preferably documents, from an upper to a lower elevation in a building. The system includes a vertical post, an outer wall that is concentric therewith, and a helical chute wound around the post. The chute is secured at an inner edge to the post and at an outer edge to the wall. The chute comprises a plurality of chute segments secured together in stepped relationship to each other. Each chute segment has a triangular upper wall disposed at a first angle to the post and sloping downwardly toward the outer wall. The upper wall is simultaneously disposed at a second angle to the horizontal and slopes generally downwardly toward a lower end of the post. Each chute segment further includes a first flange extending upwardly from the upper wall and a second flange extending downwardly from the upper wall. Adjacent chute segments are secured together by welding the second flange of a first chute segment to the first flange of a second chute segment.

22 Claims, 5 Drawing Sheets

DOCUMENT CONVEYING SYSTEM

BACKGROUND OF THE INVENTION

1. Technical Field

This invention generally relates to chute systems. More particularly, the invention relates to a chute system used for conveying documents. Specifically, the invention relates to a spiral chute comprising a plurality of wedge-like chute segments secured together in stepped relationship to each other and between a vertical post and concentric outer wall, and where each chute segment has an upper wall disposed at a first angle to the post and slopes downwardly toward the outer wall.

2. Background Information

Many buildings include chute systems for moving materials from upper floors to a lower floor for processing or disposal. One such system is a chute designed for garbage disposal. In this type of system, a substantially straight chute tube extends between the upper and lower floors in the building and an access door is provided on each floor. Garbage bags introduced through the access doors essentially free fall through the chute from the upper floor to the lower floor. This can prove problematic in that the bags will reach the bottom traveling at a fairly high rate of speed and many of the bags will burst on impact. Consequently, these chutes are often provided with an angled lower region so that the bags will be slowed down by friction as they approach the bottom of the chute. This type of chute system is practical in instances where the flow of material through the chute is sporadic and where the materials moving down the chute are heavy and could become stuck on the chute if the angle thereof was more gradual.

To address some of these issues, a plurality of spiral chutes have been disclosed in the prior art. For example, U.S. Pat. No. 1,802,089, issued to Pfeiffer discloses a gravity feed chute that comprises a plurality of spiral sections that are welded together and is supported between a plurality of external support rods. The chute has a bottom wall that angles inwardly toward the central axis of rotation of the helix. The chute further includes an outer sidewall that extends upwardly from the bottom wall at a gentle angle. The chute is designed to convey materials from an upper elevation to a lower elevation at a substantially constant rate of speed. The angle between the sidewall and bottom wall causes the conveyed material to ride partially up the side wall and the additional friction caused by this contact slows the material down as it travels along the chute. The bottom walls of the adjacent chute segments are substantially coplanar creating a smooth surface over which the material travels.

There are other instances where utilizing a basically vertical chute is not desirable. This is the case when a chute is used for moving materials that are not enclosed in bags or containers, e.g., loose seed. In this instance, if the chute was a vertical tube, the falling seed would generate a large quantity of dust at the base of the chute. A quantity of the seed might also be crushed or damaged by impacting the base of the chute and having a large volume of material fall thereon. Furthermore, the flow rate of the seed would be difficult to control and the material would likely back up the chute. A potential solution to these problems is provided by the chute disclosed in U.S. Pat. No. 3,976,176. This chute is in the form of a suspended spiral channel that is welded at one end to a central post and has an upturned side wall at the outside edge. The chute terminates a short distance from the bottom of the silo. The pitch of the chute is about thirty inches between flights. The bottom wall of the chute is smooth and this allows the seed to flow easily down the chute but not at a velocity that will cause it to be damaged when it exits the chute. As the silo fills up and the bottom of the chute becomes buried, the side wall is short enough to allow seed to progressively spill over the same.

U.S. Pat. No. 5,083,651 discloses a spiral feed chute for conveying tablets and other fragile materials into containers. One of the problems with moving tablets along a feed chute is that they tend to form long lines of single tablets which get backed up in the chute. This is known as freight-training and may lead to crushing of at least some of the tablets and a slowing or halting of the feed process. This patent discloses a chute designed to reduce the tendency for backing up of the product and which promotes the flow of tablets down the chute. The chute comprises a series of spiral flights that are secured between two spaced apart support rods. The flights are connected to each other in a stepped relationship. Each flight comprises a smooth spiral channel with a short sidewall on the outermost edge of the spiral. Each pair of adjacent flights is secured together in a stepped relationship by a strap attached to the undersides of the two chute flights. Additionally, an offset segment secures the two chutes together in such a manner that a portion of the offset extends into the chute channel and a small gap is created between the two adjacent flights. At each joint region, a length of the sidewall of an upper flight overlaps a length of the sidewall of the lower flight thereby forming an offset region that extends into the channel. The step down at the strap combined with the offset, serves to interrupt the flow pattern of materials moving down the chute and thereby prevents the backing up of the same.

U.S. Pat. No. 5,598,914 issued to Sulzer et al discloses a spiral chute that has a center post and an upstanding side wall. The bottom wall of the chute channel either is substantially horizontal or slopes downwardly and inwardly toward the center post. The sections of the side wall are made from stainless steel and are laterally adjustable to decrease the width of the chute channel. This adjustability allows the operator to control the velocity with which different objects travel down the chute.

Other examples of spiral chutes are found in U.S. Pat. No. 4,726,456 to Hogsett and U.S. Pat. No. 6,851,911 to Lhoest.

Spiral chutes have also been used for the disposal of sensitive documents in settings such as government buildings. In these instances, the documents are bagged and introduced through access doors and onto the spiral chute. The chutes currently in use are manufactured from galvanized metal and have the appearance of a swimming pool slide. They may be as large as six feet in diameter, are generally circular in cross-section and may extend downwardly for several floors in larger government buildings. The bags that are placed on the chute may contain a single sheet of paper or may contain up to ten pounds of paper. In the case of particularly sensitive documentation, the hope is that the bag will travel intact down the chute and into a region for incineration without splitting open. What has been found in practice, however, is that the bags do one of two things. Firstly, they slide into the central region of the chute proximate the central post and then simply free fall to the basement where they burst open, spilling the sensitive documentation. Secondly, they do not slide into the central region on the chute and remain on the face thereof, but the bags tend to become stuck somewhere along the length of the chute. This necessitates that every few months a person be sent down the chute to clear any stuck bags and to wax the surface of the chute so that the bags of paper will slide all the way down to the bottom.

There is therefore a need in the art for an improved chute system for conveying articles, particularly documents in closed containers, from an upper elevation to a lower elevation of a building, and without the container breaking open upon reaching the lower elevation.

SUMMARY OF THE INVENTION

The device of the present invention comprises a chute system for conveying articles, particularly documents, from an upper to a lower elevation within a building. The system includes a vertical post, an outer wall that is concentric therewith, and a helical chute wound around the post. The chute is secured at an inner edge to the post and at an outer edge to the wall. The chute comprises a plurality of wedge-like chute segments secured together in a stepped relationship to each other. Each chute segment has a triangular upper wall disposed at a first angle to the post and sloping downwardly toward the outer wall. The upper wall is simultaneously disposed at a second angle to the horizontal and slopes generally downwardly toward a lower end of the post. Each chute segment further includes a first flange extending upwardly from the upper wall and a second flange extending downwardly from the upper surface. Adjacent chute segments are secured together by welding the second flange of one chute segment to the first flange of the other chute segment.

The chute is between three feet and six feet in diameter and the pitch of the upper wall is such that articles tend to slide outwardly against the outer wall of the chute system and slide therealong from the upper elevation to the lower elevation. If the article comprises a bag that contains either a single sheet of paper or 10 lbs of paper, the bag will arrive at the bottom of the chute whole and unruptured. Furthermore, at least the chute segments are made from stainless steel and do not require waxing in order to allow articles to travel down the chute at a controlled velocity. The nature of the upper wall is such that articles will not get stuck somewhere along the length of the chute and have to be retrieved by sending a person down the chute as has been necessary in previously known designs. It is believed that the wedge shaped, stepped design of the chute segments in conjunction with the pitch thereof and the stainless steel from which they are made, contribute to the success of the disclosed design.

BRIEF DESCRIPTION OF THE DRAWINGS

The preferred embodiments of the invention, illustrative of the best mode in which applicant has contemplated applying the principles, are set forth in the following description and are shown in the drawings and are particularly and distinctly pointed out and set forth in the appended claims.

DETAILED DESCRIPTION OF THE INVENTION

Figure 1:
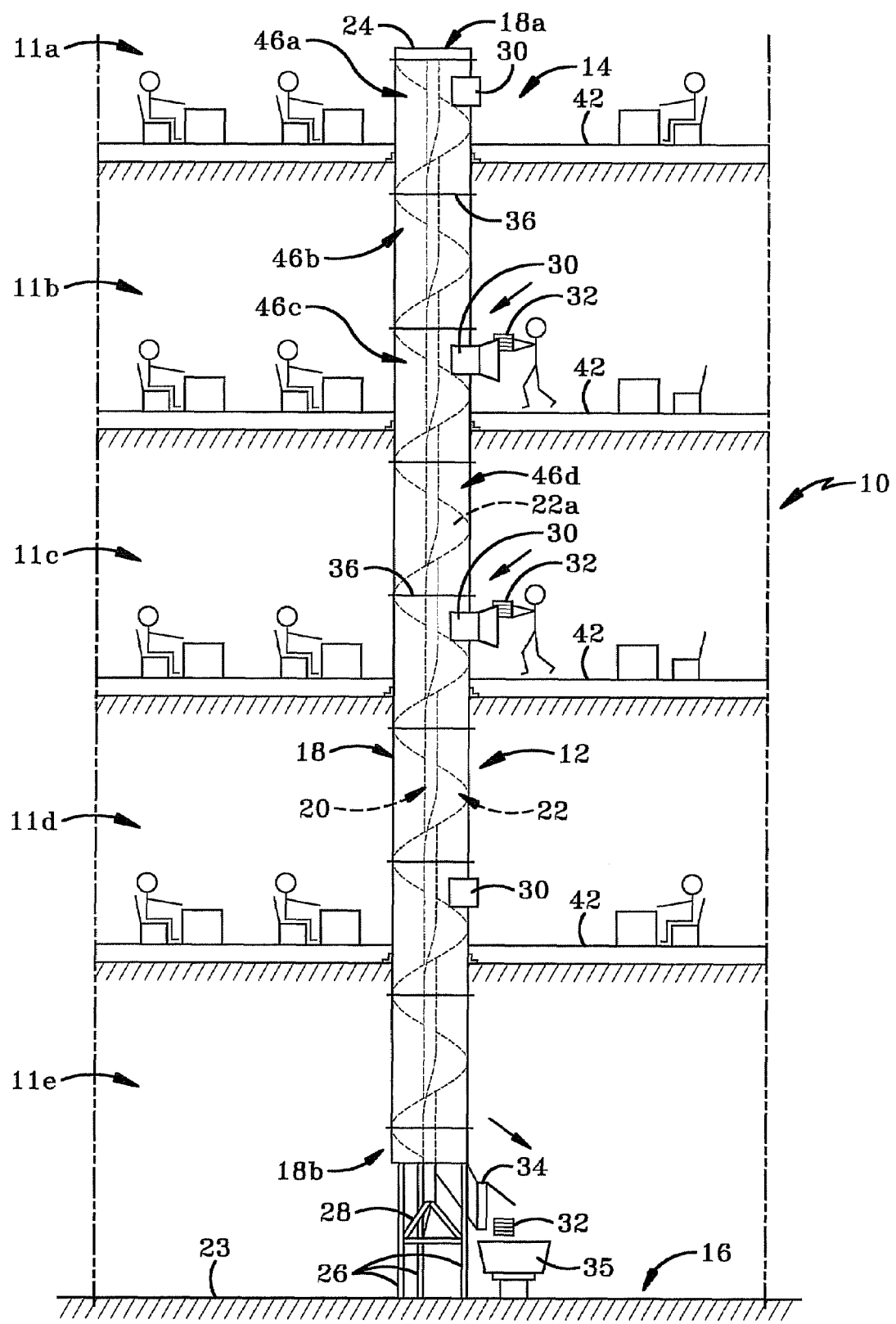
FIG. 1 is a front elevational view of a building incorporating the spiral chute system of the present invention.
Figure 2:
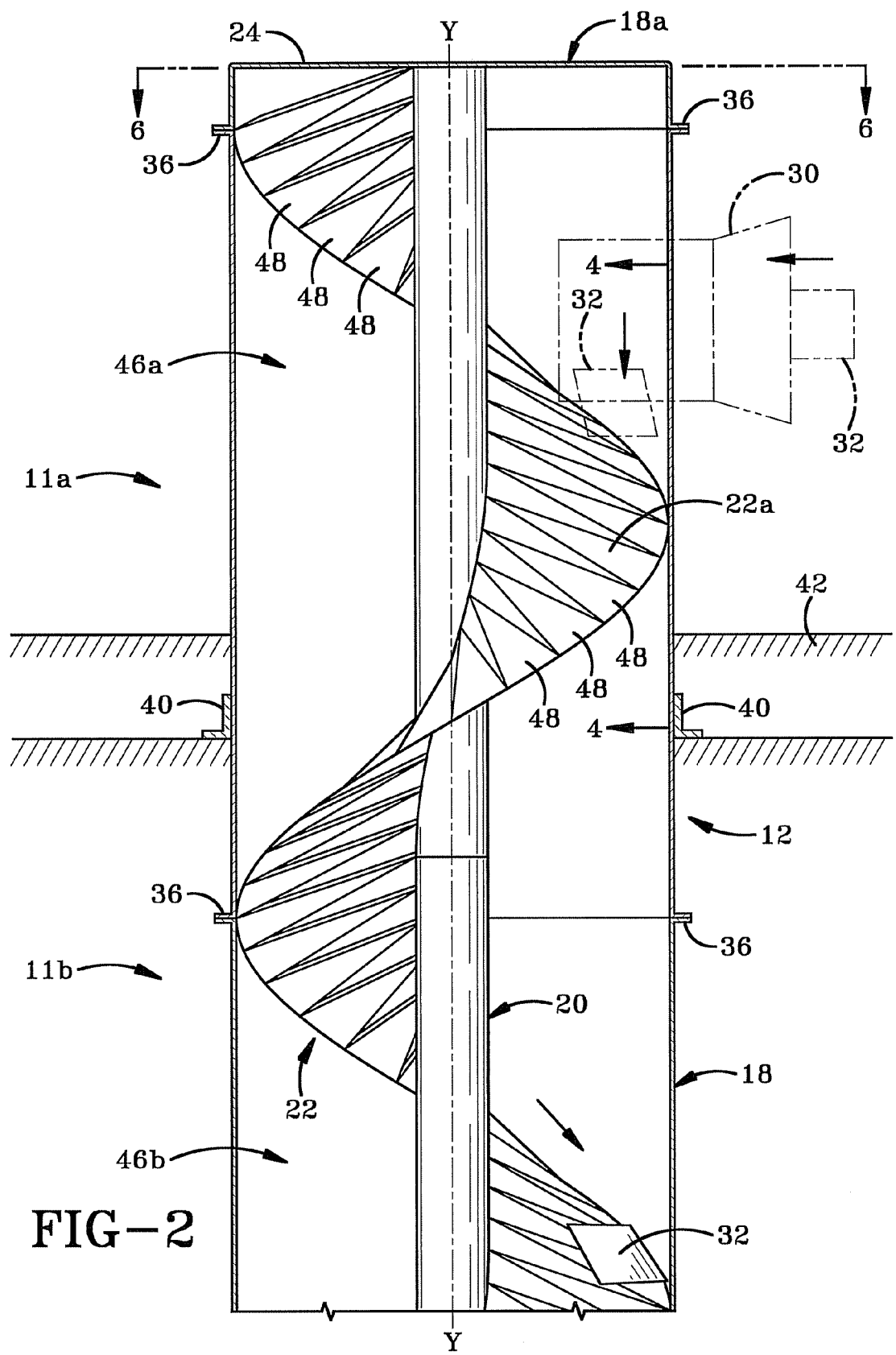
FIG. 2 is a front elevational view of a length of the spiral chute system shown in FIG. 1.

Referring to FIGS. 1-7, there is shown a building 10 that incorporates the spiral chute system of the present invention, that chute system being generally indicated at 12. Building 10 comprises a plurality of floors, namely 11a, 11b, 11c, 11d and a basement 11e. Chute system 12 extends between an upper elevation 14, such as top floor 11a, and a lower elevation 16 such as the basement 11e of building 10.

Chute system 12 comprises a substantially tubular outer wall 18 which is concentric with a central vertical post 20. A spiral chute 22 extends between outer wall 18 and post 20. The top end 18a is closed off, such as by a cap 24. Bottom end 18b of outer wall 18 is spaced a distance above the floor surface 23 and is supported by a plurality of support legs 26. A top-hinged fire-rated door 34 is provided at bottom end 18b and is retained normally in an open position as is known in the industry. Post 20 extends upwardly from proximate bottom end 18b of outer wall 18 and is connected to support legs 26 by brackets 28 that are positioned in a generally pyramidal orientation relative to each other. Post 20 forms a central axis of rotation "Y" about which articles 32 move down spiral chute 22. Articles 32 may be of any nature but chute 22 is designed particularly to convey documents and more particularly documents that are enclosed in bags or the like. A plurality of access doors 30 are provided at vertical intervals in outer wall 18. Preferably, an access door 30 is provided on each floor 11a-11e to allow articles 32 to be introduced into chute system 12 on each floor. Articles 32 exit chute system 12 through exit door 34 and may then be collected in a hopper 35 or another disposal or processing mechanism provided adjacent door 34.

One of the design constraints for any chute system 12 is that the door 30 has to be set at a particular height relative to the floor 11. This height, which typically is around three and a half feet above the floor 11, allows a person to easily introduce articles 32 into the chute system 12. Buildings 10 are constructed so that the height between adjacent floors, such as 11a, 11b is set at ten to fourteen feet. With respect to the present invention, the article conveying surface 22a (FIG. 2) of chute 22 is set at a first angle β (FIG. 7) relative to post 20. Angle β is such that the article conveying surface of chute 22 slopes downwardly away from post 20 and toward outer wall 18. Angle β is selected to suit the floor to floor height in a particular building 10 so that the chute 22 will not obstruct door 30. So, for example, angle β may be set at about three degrees for a floor to floor height of ten feet and around six degrees for a floor to floor height of fourteen feet.

In accordance with a specific feature of the present invention, spiral chute 22 is formed from a plurality of spiral flights 46a, 46b, 46c, etc. that are secured together in end-to-end relation. Each flight 46 includes a section of spiral chute 22 which winds around the post 20 through substantially one hundred and eighty degrees. Each flight 46 is constructed by securing a plurality of individual chute segments 48 to each other and securing those segments 48 between a length of post 20 and a length of outer wall 18. In each flight 46, such as flight 46a for example, the chute segments 48 are connected together in such a way that they resemble a stepped, spiral staircase, arranged in a one-hundred and eighty degree helix. The steps in this staircase are situated at the junction of each pair of adjacent chute segments 48. Pairs of adjacent flights 46a, 46b are secured together in end-to-end relation by a suitable means such through the use of connectors 36 applied to annular lips formed at either end of the lengths of outer wall 18. Alternatively, pairs of adjacent flights may be secured together by welding. When secured together, each connected pair of flights 46, such as 46a, 46b, resembles a continuous staircase that spirals through three-hundred and sixty degrees. The chute segments 48, and therefore the flights 46, may be oriented around post 20 in either of a clockwise and counterclockwise direction. Connectors 40 are used to secure outer wall 18 of chute system 12 to the floor joists or concrete floors 42 in building 10.

Figure 3:
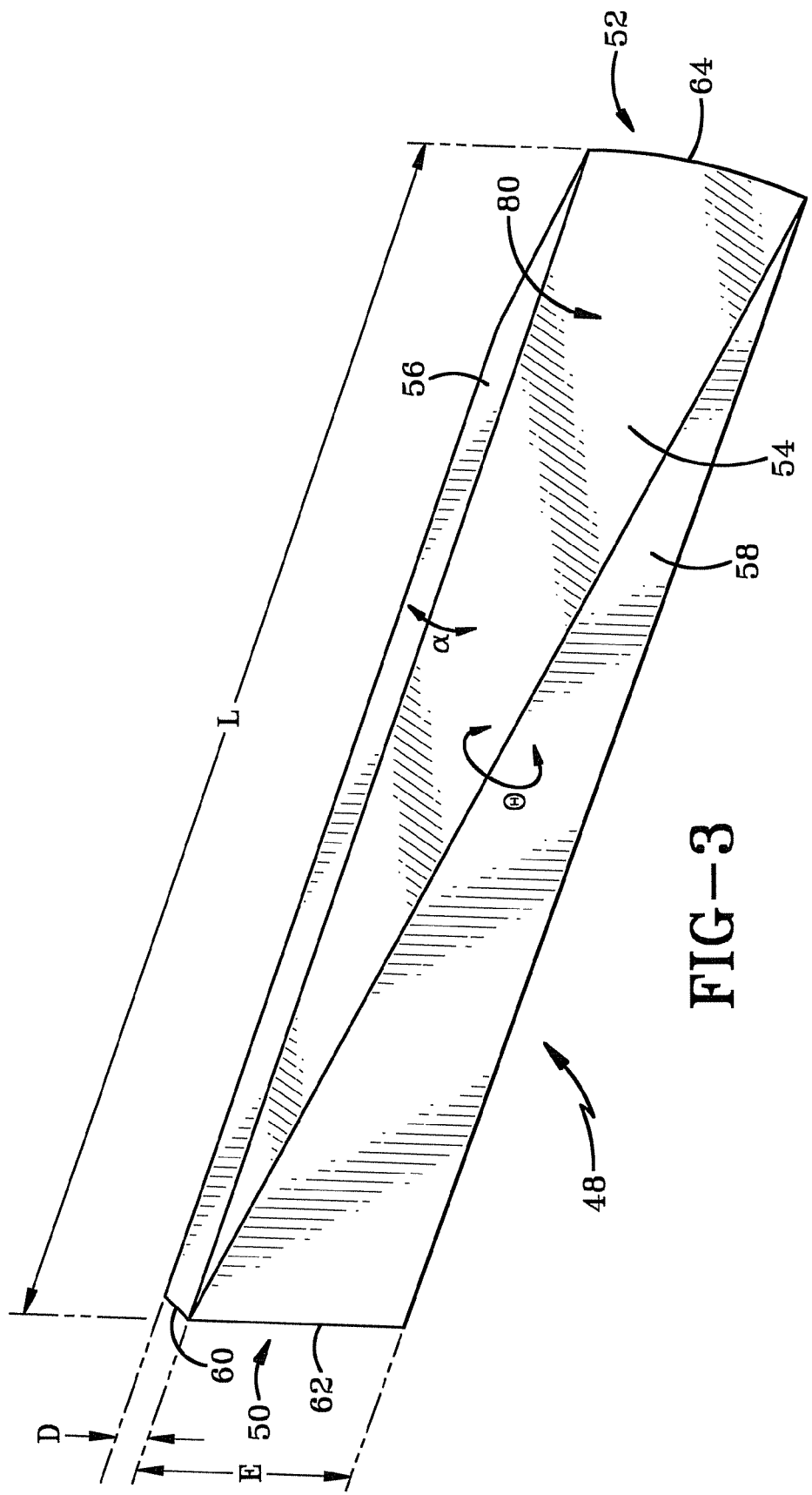
FIG. 3 is a perspective view of a single chute segment which is the base unit used to form the article-conveying surface of the chute.

Referring to FIG. 3, there is shown a single chute segment 48 which constitutes the base unit for forming chute 22. Chute segment 48 has an inner end 50 that is welded or otherwise secured to post 20, and an outer end 52 that is welded or otherwise secured to outer wall 18. Chute segment 48 includes a substantially planar and generally triangularly shaped upper wall 54 having an apex proximate inner end 50 and an outer edge 64 proximate outer end 52. Upper wall 54 of chute segment 48 has a first side and second side that extend between the apex and outer edge 64. A first flange 56 is provided along the first side of upper wall 54 and extends outwardly away from upper surface 80 thereof in a first direction. A second flange 58 is provided along the second side of upper wall 54 and extends outwardly away from upper surface 80 in a second direction. First flange 56 is disposed at an angle α (FIG. 3) of around 40 and 50 degrees to the upper surface 80 of wall 54. Preferably angle α is between 42 and 47 degrees relative to the upper surface 80. First flange 56 preferably is of a substantially constant width "D" beginning proximate the apex of wall 54 and extending outwardly toward outer edge 64. Width "D" is therefore substantially constant for most of the length "L" of wall 54. However, from a first position that is spaced a distance inwardly from outer edge 64, first flange 56 tapers from width "D".

Second flange 58 preferably is disposed at an angle θ relative to upper surface 80 of upper wall 54. Angle θ is generally between 130 and 140 degrees to the upper surface 80 of wall 54, and preferably is between 132 and 137 degrees. The width of second flange 58 is greatest proximate the apex of upper wall 54. This greatest width is indicated in FIG. 3 as width "E". Width "E" is greater than the width "D" of first flange 56. Second flange 58 tapers from inner end 50 outwardly toward outer end 52. Preferably angles α and θ are set such that first and second flanges 56, 58 are substantially parallel to each other. Chute segment 48 is therefore generally "Z" shaped when viewed from outer end 52 thereof as shown in FIG. 5.

Figure 5:
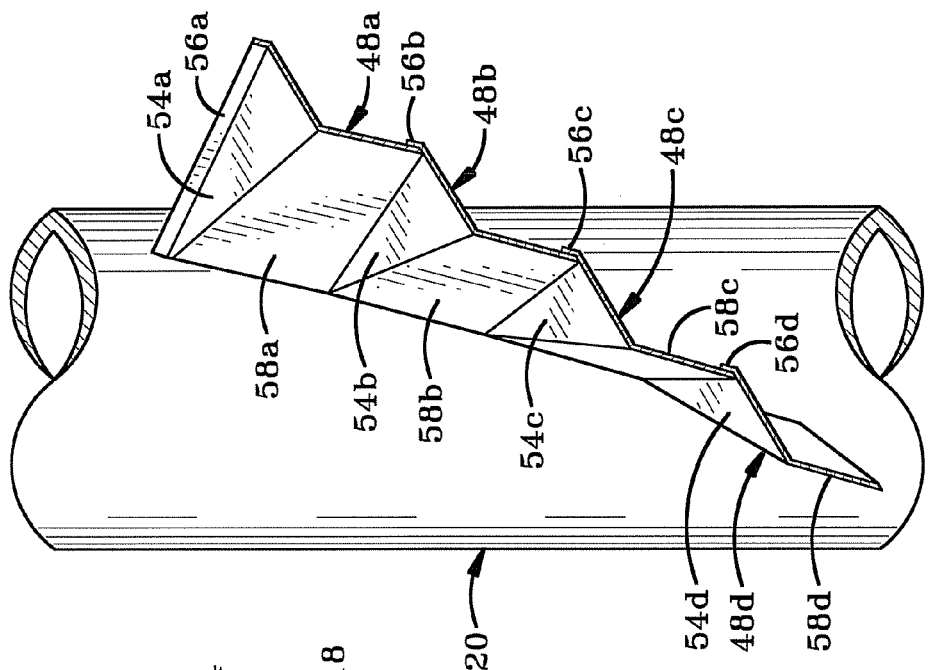
FIG. 5 is a partial cross-sectional front view of the spiral chute with the outer wall removed to show how the individual chute segments are joined together.
Figure 4:
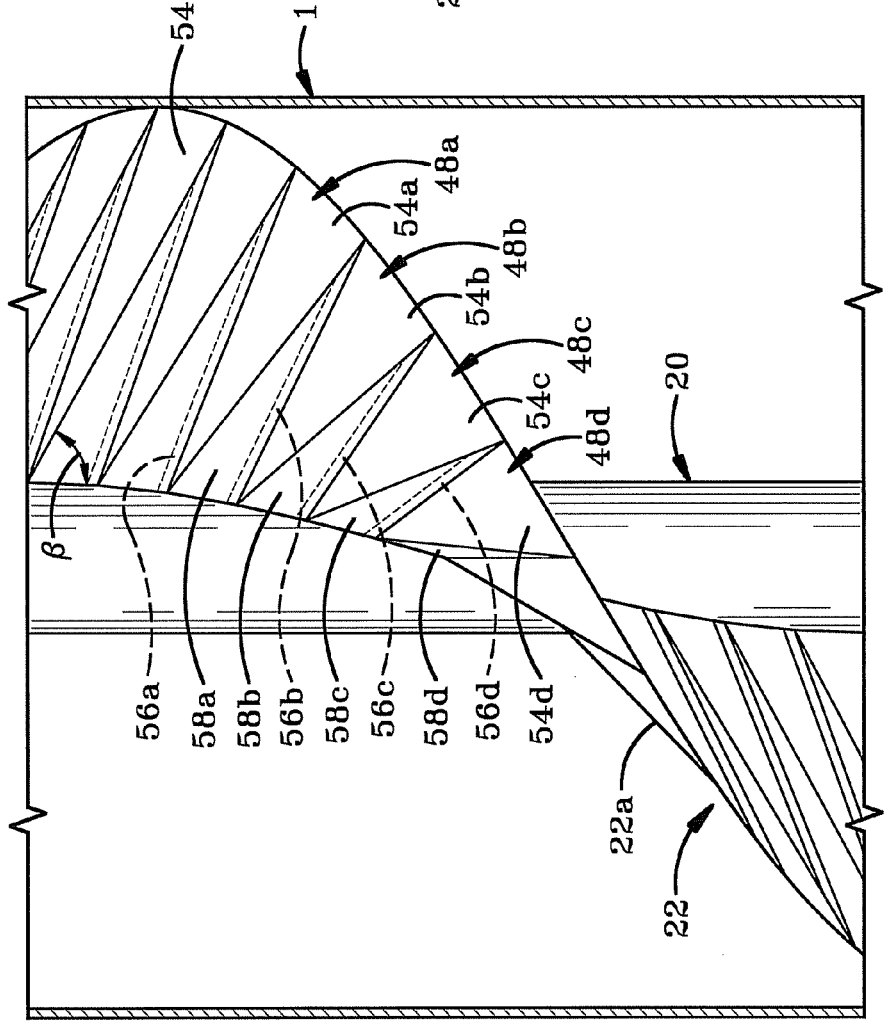
FIG. 4 is a front elevational view of a portion of the spiral chute showing a plurality of chute segments joined together.
Figure 6:
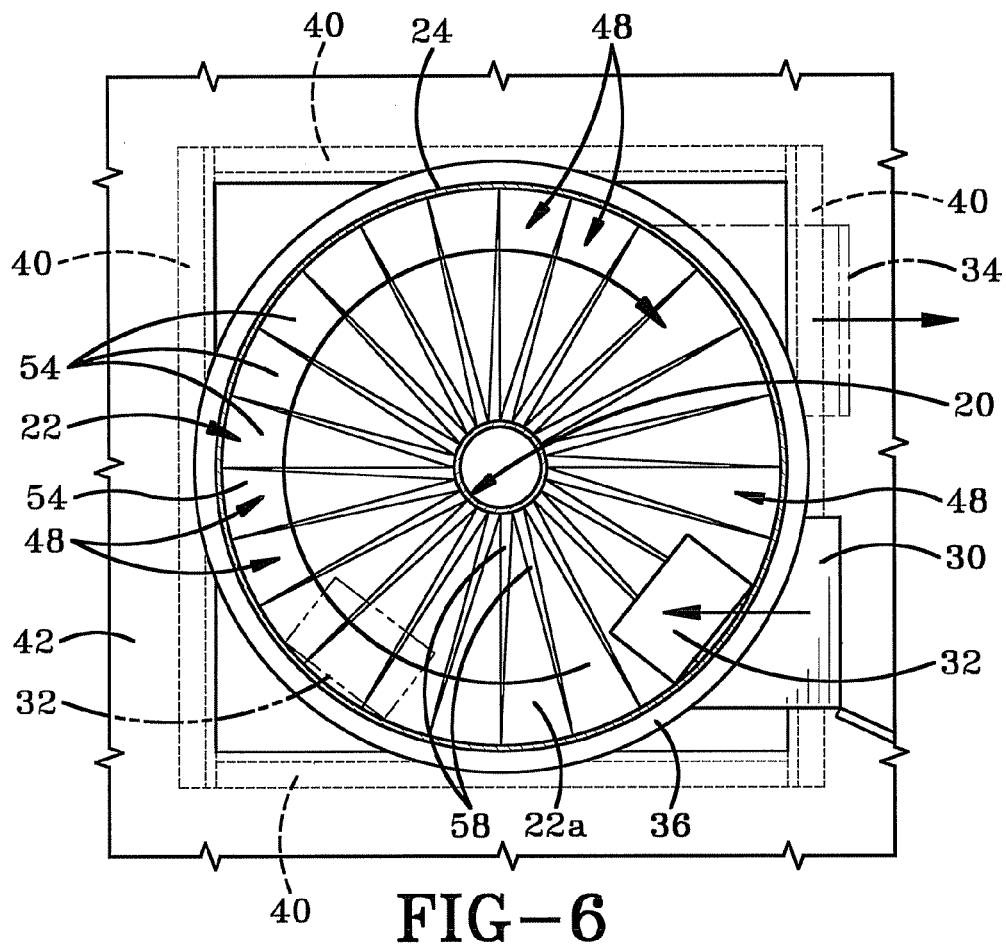
FIG. 6 is a top view of the chute taken through line 6-6—of FIG. 2.
Figure 7:
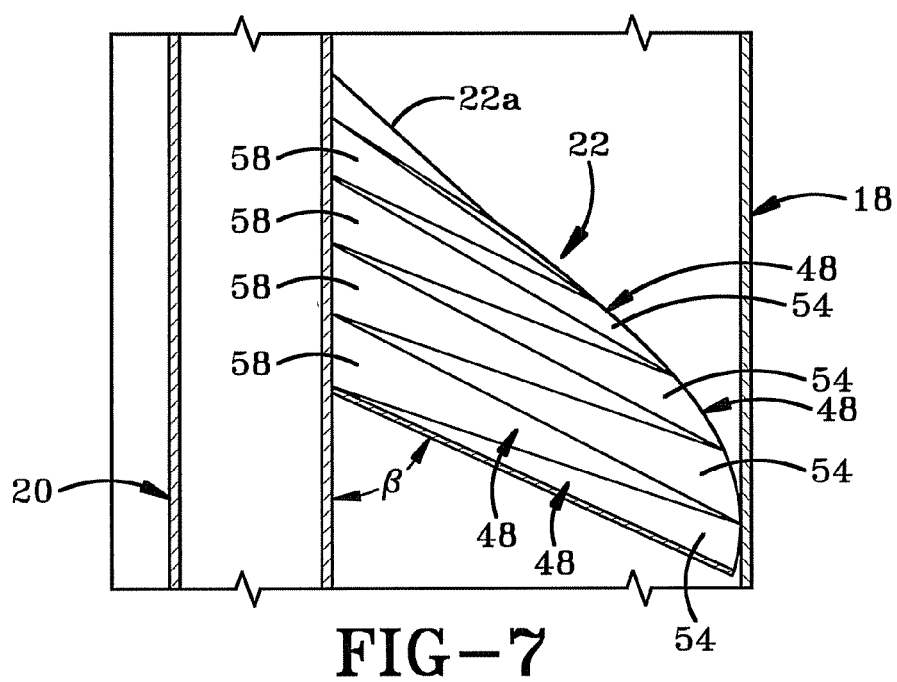
FIG. 7 is cross-sectional front view of the chute showing the downwardly sloping angle of the chute segments relative to the post and outer wall.

As shown in FIGS. 4 and 5, first and second flanges 56, 58 are provided to aid in securing adjacent chute segments 48 together in a sloped and stepped arrangement. FIGS. 4 and 5 show chute segments 48a, 48b, 48c and 48d welded together and welded to central post 20. Chute segment 48a comprises wall 54a, upwardly extending first flange 56a and downwardly extending second flange 58a. Second chute segment 48b comprises wall 54b, upwardly extending first flange 56b and downwardly extending second flange 58b. First and second chute segments 48a, 48b are joined together by positioning interior surface of second flange 58a against the exterior surface of first flange 56b. The outer edge of second flange 58a is placed in abutting contact with the upper surface of wall 54b of chute segment 48b. Second flange 58a and first flange 56b preferably are stitch-welded or spot-welded together. When chute segments 48a, 48b are secured together, wall 54a is spaced a distance vertically above wall 54b and these walls 54a and 54b are substantially parallel to each other. Additionally, first and second flanges 56b, 58a and first flange 56a are also substantially parallel to each other.

Second and third chute segments 48b, 48c are secured together by positioning the outer edge of second flange 58b against the upper surface of upper wall 54c of chute segment 48c. The interior surface of second flange 58b is placed in abutting contact with the exterior surface of first flange 56c and is welded in place. Once again, this causes wall 54c to be spaced a distance vertically beneath wall 54b with the walls 54b, 54c being parallel to each other and to wall 54a. Fourth chute segment 48d is secured to third chute segment 48c by welding second flange 48c to first flange 56d. As previously mentioned, walls 54a, 54b, 54c, and 54d are connected in this stepped relationship to each other in such a manner that chute 22 resembles a spiral staircase. Front edge 62 (FIG. 3) of each second flange 58 is welded to post 20, preferably using a solid weld. The outer edge 64 of each chute segment 48 is preferably solid welded to an interior surface of outer wall 18. The arrangement of these component parts in this manner causes walls 54a-54d to slope downwardly away from post 20 and toward outer wall 18 at first angle β relative to vertical post 20.

The upper walls 54 of all of the chute segments 48 form the article conveying surface 22a of chute 22. The apices of all chute segments 48 are positioned proximate post 20 and the outer edges 64 thereof are positioned proximate outer wall 18. Chute segments 48 are connected together so that upper walls 54a, 54b, 54c and 54d are disposed generally at a second angle relative to the horizontal. This second angle slopes downwardly from the horizontal and generally in the direction of the bottom end of post 20. The second angle generally is between 50 and 70 degrees to the horizontal, and preferably is between 55 and 65 degrees to the horizontal. The pitch of the chute 22 is substantially set by first angle β and the second angle to the horizontal.

In accordance with the present invention, chute 22 preferably is between three feet and six feet in diameter. Consequently, the pitch of each flight 46, e.g., flight 46a, preferably is between seventy and ninety inches. Furthermore, the length "L" of each chute segment 48 is between fifteen and forty inches, and preferably is between twenty and twenty and a half inches. The maximum width "D" of first flange 56 is between a quarter inch and one inch, and preferably is between a half inch and three quarters of an inch. The maximum width "E" of second flange 58 is between three and seven inches, and preferably is between four and six inches. Each chute segment 48 preferably is manufactured entirely from stainless steel and, consequently, article conveying surface 22a formed by upper walls 54 requires no waxing in order to allow articles 32 to slide easily therealong. Outer wall 18 preferably is aluminized or galvanized but may, alternatively, be manufactured from stainless steel. Post 20 may also be manufactured from stainless steel or any other suitable material.

In use, an article 32 is introduced into chute system 12 by inserting it through one of the access doors 30 and placing it onto upper surface 22a of chute 22. Article 32 starts to slide down upper surface 22a and, because of the downward slope of the upper walls 54 of chute segments 48, article 32 tends to slide downwardly and outwardly toward outer wall 18. At the same time, article 32 tends to slide downwardly toward lower end 18b of chute system 12. The combination of the angle of the chute segments 48 relative to post 20 and outer wall 18 and the angle of the upper surfaces 54 of the individual chute segments 48 toward lower end 18b, tends to cause the articles 32 traveling down chute system 12 to be flung outwardly onto the interior surface of outer wall 18. Article 32 continues to move down chute 22 and tends to slide at least partially along outer wall 18 until it reaches exit door 34. Article 32 drops through exit door 34 and into a disposal means such as hopper 35. The chute design is such that both light and heavy articles 32 will tend to travel down chute system 12 at a controlled and substantially constant velocity. The stepped nature of flights 46 may assist in aiding the article 32 to move down chute 22 as the slope and drop from one upper wall 54 to another adds impetus to the movement of article 32. The stainless steel used in the manufacture of chute segments 48 also reduces the likelihood of articles becoming stuck part-way down chute 22.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of the invention are an example and the invention is not limited to the exact details shown or described.

The invention claimed is:

1. A chute system for conveying articles from an upper elevation to a lower elevation within a building, said chute system comprising:
a vertical post defining an axis of rotation;
an outer wall concentric with said post; and
a helical chute wound around said vertical post and being secured at an inner edge to said post and at an outer edge to said outer wall; and wherein said chute comprises a plurality of chute segments secured together in stepped relationship to each other: each chute segment having an upper wall disposed at a first angle to the post and sloping downwardly toward the outer wall; and wherein the first angle is between 3 and 6 degrees to the vertical post.

2. The chute system as defined in claim 1, wherein the upper wall of each chute segment is further disposed at a second angle relative to the horizontal and slopes generally downwardly toward the lower end of the post.

3. The chute system as defined in claim 1, wherein the outer wall extends from proximate an upper end of the post to a lower end thereof; and wherein the chute system further comprises a plurality of access doors provided at vertical intervals along the outer wall; said access doors being adapted to allow articles to be introduced into the chute system to travel downwardly from the upper elevation to the lower elevation.

4. The chute system as defined in claim 1, wherein the upper walls of the chute segments and the outer wall are free of wax and permit movement of both light and heavy objects down the chute system at a controlled and substantially constant velocity.

5. The chute system as defined in claim 1, wherein the upper wall of each chute segment is generally triangular in shape having an apex proximate the post, an outer edge proximate the outer wall and opposed first and second side edges extending between the apex and the outer edge.

6. The chute system as defined in claim 5, wherein each chute segment further comprises a first flange that extends outwardly and in a first direction from the first side edge.

7. The chute system as defined in claim 6, wherein each chute segment further comprises a second flange that extends outwardly and in a second direction from the second side edge.

8. The chute system as defined in claim 7, wherein the first flange is disposed at a third angle to the upper surface of the upper wall, and the second flange is disposed at a fourth angle to the upper surface of the upper wall.

9. The chute system as defined in claim 8, wherein the third angle is between 40 and 50 degrees, and the fourth angle is between 130 and 140 degrees.

10. The chute system as defined in claim 7, wherein the chute segment is substantially Z-shaped in cross-section when viewed from the outer edge of the upper wall.

11. The chute system as defined in claim 6, wherein the first flange has a first width from proximate the apex of the upper wall to a first position spaced a distance inwardly from the outer edge of the upper wall.

12. The chute system as defined in claim 11, wherein the first flange tapers in width from the first position to the outer edge.

13. The chute system as defined in claim 7, wherein the second flange is generally triangular in shape and has a maximum width proximate the apex of the upper wall and a minimum width proximate the outer edge thereof.

14. The chute system as defined in claim 7, wherein a first and a second chute segment in the chute are secured together so that the second flange of the first chute segment abuts the first flange of the second chute segment.

15. The chute system as defined in claim 1, wherein the plurality of chute segments are welded to each other and to the post and outer wall in such a manner that there are no gaps between the chute segments, the post and the outer wall.

16. The chute system as defined in claim 1, wherein at least the chute segments are manufactured from stainless steel.

17. The chute system as defined in claim 1, wherein the outer wall has an external diameter that is between three and six feet.

18. A chute system for conveying articles from an upper elevation to a lower elevation within a building, said chute system comprising:
a vertical post defining an axis of rotation;
an outer wall concentric with said post; and
a helical chute wound around said vertical post and being secured at an inner edge to said post and at an outer edge to said outer wall; and wherein said chute comprises a plurality of chute segments secured together in stepped relationship to each other: each chute segment having an upper wall disposed at a first angle to the post and sloping downwardly toward the outer wall; and wherein a first plurality of chute segments are joined together to a length of post and to a length of outer wall to form a first helix that spirals through one hundred and eighty degrees; and a second plurality of chute segments are joined sequentially together to a second length of post and to a second length of outer wall to form a second helix that spirals through one hundred and eighty degrees; and wherein the first and second helixes are secured together in end-to-end relation to form a continuous chute that resembles a stepped spiral staircase.

19. A chute system for conveying articles from an upper elevation to a lower elevation within a building, said chute system comprising:
a vertical post defining an axis of rotation;
an outer wall concentric with said post; and
a helical chute wound around said vertical post and being secured at an inner edge to said post and at an outer edge to said outer wall; wherein said chute comprises a plurality of chute segments secured together in stepped relationship to each other; each chute segment having an upper wall disposed at a first angle to the post and sloping downwardly toward the outer wall, and wherein the upper wall of each chute segment is further disposed at a second angle relative to the horizontal and slopes generally downwardly toward the lower end of the post; and the second angle is between 50 and 70 degrees to the horizontal.

20. The chute system as defined in claim 19, wherein the upper wall of each chute segment is generally triangular in shape and includes:

an apex proximate the post;
an outer edge proximate the outer wall;
opposed first and second side edges extending between the apex and the outer edge:
a first flange that extends outwardly and in a first direction from the first side edge; and
a second flange that extends outwardly and in a second direction from the second side edge.

21. The chute system as defined in claim 20, wherein the first flange is disposed at a third angle to the upper surface of the upper wall and the third angle is between 40 and 50 degrees; and the second flange is disposed at a fourth angle to the upper surface of the upper wall and the fourth angle is between 130 and 140 degrees.

22. The chute system as defined in claim 20, wherein the first flange has a first width from proximate the apex of the upper wall to a first position spaced a distance inwardly from the outer edge of the upper wall; and the first flange tapers in width from the first position to the outer edge; and the second flange is generally triangular in shape and has a maximum width proximate the apex of the upper wall and a minimum width proximate the outer edge thereof; and wherein a first and a second chute segment in the chute are secured together so that the second flange of the first chute segment abuts the first flange of the second chute segment.

* * * * *